3,151,088
CATALYST DEMETALLIZATION
Robert A. Sanford, Homewood, and Arvin D. Anderson, Park Forest, Ill., assignors, by mesne assignments, to Sinclair Research, Inc., New York, N.Y., a corporation of Delaware
No Drawing. Filed Dec. 2, 1960, Ser. No. 73,199
14 Claims. (Cl. 252—416)

This invention is a method for the removal of poisoning metals from a synthetic gel silica-based hydrocarbon conversion catalyst. The method is useful in conjunction with hydrocarbon conversion processes where a hydrocarbon feedstock, contaminated with nickel and perhaps iron compounds, deposits metal contaminants on the catalyst. The method comprises removing the catalyst containing metal contaminants from the hydrocarbon conversion zone, sulfiding the metal poisoned catalyst at an elevated temperature, treating the catalyst with a carbonylating agent during which metal carbonyl is formed and vaporized, and returning the demetallized catalyst to the hydrocarbon conversion process. The carbonylation process of this invention may be enhanced by the presence of certain promoters in the carbon monoxide carbonylating vapor. The invention may be used as part of a more elaborate procedure, for example, for the removal of vanadium, by chlorinating the catalyst. In the case of catalysts containing magnesia or other basic oxides, vanadium removal is conveniently performed by a basic aqueous wash. The catalyst may be prepared for vanadium removal via either procedure by giving it a high temperature treatment with molecular oxygen-containing gas. After the demetallization treatment the catalyst, having a reduced content of poisoning metals, is returned to the hydrocarbon conversion system.

Although it has been suggested, for example in U.S. Patent No. 2,575,258, that the use of carbon monoxide on a catalyst poisoned with iron may mask poisoning activity in further cracking, it has been found highly advantageous to use CO at a reduced temperature to actually remove nickel as the carbonyl. Many proposed processes of catalyst demetallization require, at least in some stage of the process, contact between the catalyst and acid acting and/or aqueous media. Where magnesia or other basic acting oxide is an essential constituent of the catalyst, such acid contact easily may deleteriously affect the structure, porosity, activity, etc. of the catalyst. In the practice of this invention these deleterious effects are obviated. The process of this invention may also eliminate the need for any contact of the catalyst with aqueous media. Such contact brings about expensive heat losses and may damage the catalyst if not handled properly. Manipulative disadvantages also accrue from the handling of aqueous slurries of finely divided catalysts. In this invention, however, particularly when chlorination is employed, removal of the major contaminants, nickel and vanadium, is possible without any liquid phase operations.

Catalytically promoted methods for the chemical conversion of hydrocarbons include cracking, hydrocracking, reforming, hydroforming, coking, deasphalting, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e. liquid or vapor, state and the products of the conversion frequently are lower-boiling materials. In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures generally up to about 200 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g. silica-alumina, silica-magnesia, silica-zirconia, etc., compositions in a state of slight hydration and containing small amounts of acidic or basic oxide promoters in many instances. The oxide catalyst may be alumina- or silica-based and ordinarily contains a substantial amount of a gel or gelatinous precipitate comprising a major portion of silica and at least one other material, such as alumina, magnesia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel catalysts, which are more uniform and less damaged by high temperatures in treatment and regeneration, is often preferable. Popular synthetic gel cracking catalysts generally contain about 10 to 35% alumina or magnesia. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example, it may be made by the precipitation of silica-alumina on a clay, such as kaolinite or halloysite. One such semi-synthetic catalyst contains about equal amounts of silica-alumina gel and clay.

The manufacture of synthetic gel silica-alumina catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, magnesia, etc. For example, U.S. Patent 2,699,430 gives a method for making a silica-based catalyst containing about 23 to 33% magnesia. These synthetic gel type catalysts are activated or calcined before use. The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally, these beads may range in size up to about ½″ in diameter. When fresh, the minimum sized bead is generally about ⅛″. Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form. Various petroleum stocks have been known to contain at least traces of many metals. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants. Of the various metals which are to be found in representative hydrocarbon feedstocks some, like the alkali metals, only deactivate the catalyst without changing the product distribution therefore they might be considered true poisons. Others such as iron, nickel, vanadium, and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of gasoline, based on cracking feed disappearance to lighter materials dropped from 93 to 82% when the laboratory-measured coke factor of a catalyst rose from 1.0 to 3.0 in commercial cracking of a feedstock containing some highly contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metals content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined only by a comprehensive study of the refinery's operations.

A further alternative, demetallizing the catalyst, which avoids discarding of expensive catalyst, and enables much lower grade, highly metals-contaminated feedstocks to be used, is now possible in this invention. In the process a catalyst contaminated with nickel by use in converting a nickel-containing petroleum feedstock may be treated only for nickel removal, or the catalyst may be treated for iron and/or vanadium removal as well.

Commercially used cracking catalysts are the result of years of study and research in the nature of cracking catalysis, and the cost of the catalysts is not negligible. The cost frequently makes highly poisoned feedstocks less desirable to use in cracking operations, even though they may be in plentiful supply, because of their tendency to damage the expensive catalysts. The expense of such catalysts, however, is justified because of the composition, structure, porosity and other characteristics of such catalysts are rigidly controlled so that they may give optimum results in cracking. It is important therefore, that removing poisoning metals from the catalyst does not jeopardize the desired chemical and physical constitution of the catalyst. Although methods have been suggested in the past for removing poisoning metals from a catalyst which has been used for high-temperature hydrocarbon conversions, for example, the processes of U.S. Patents 2,488,718; 2,488,744; 2,668,798 and 2,693,455, the severity of prior art demetallizing conditions has been criticized in U.S. Patent No. 2,901,419. This latter patent, along with a number of other patents seeks to solve the problem of metal poisoned catalysts by adding inhibiting or masking materials to the poisoned catalyst. There is a limit, of course, to just how much of such materials may be allowed to accumulate on a catalyst. However, the process of this invention is effective to remove nickel and other metals without endangering the expensive catalyst.

In this invention, the hydrocarbon petroleum oils utilized as feedstock for a conversion process may be of any desired type normally utilized in catalytic conversion operations. This feedstock contains poisoning metal, sometimes as much as 3%, and the catalyst may be used as a fixed, moving or fluidized bed or may be in a more dispersed state. For typical operations, the catalytic cracking of the hydrocarbon feed would normally result in a conversion of about 50–60 percent of the feedstock into a product boiling in the gasoline boiling range. The catalytic conversion system usually also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. In the process of this invention, regeneration of any particular quantum of catalyst is generally continued until the carbon content is less than about 5.0%, preferably less than about 0.5%. After regeneration the catalyst to be demetallized is removed from the conversion system, sulfided, carbonylated and returned to the conversion system.

Where a poisoned catalyst is to be treated for the removal of vanadium and additional iron, as well as nickel, a high temperature treatment with oxygen-containing gas can be performed, preferably before sulfiding. Ordinarily the catalysts are treated before the poisoning metals have reached an undesirably high level, for instance, about 2%, generally no more than about 1%, maximum, content of any one poisoning metal. Prior to other treatments subjecting the poisoned catalyst sample to magnetic flux may be found desirable to remove any tramp iron particles which may have become mixed with the catalyst. When oxygen treatment is employed in the process of this invention, the regeneration of any particular quantum of catalyst is generally continued until the carbon content is less than about 0.5%.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent and the sulfiding gas may contain about 10 to 100 mole percent $H_2S$, preferably at least about 25 mole percent $H_2S$. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Usually about 1–4 hours is a sufficient time. Temperatures of about 1100 to 1300° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix.

Carbonylation takes place at a temperature substantially lower than the sulfiding process, from about ambient temperature to 400° F. maximum and preferably at an elevated temperature of about 100–300° F. The carbonylation gas contains usually about 50–100 mole percent carbon monoxide with or without traces of carbonylation promoters such as $H_2S$, $NH_3$, $SO_2$, carbonyl sulfide, hydrogen or iodine to increase the carbonylation reaction rate. The remainder of the carbonylation gas is preferably an inert diluent gas such as nitrogen or carbon dioxide. The gas preferably contains about 90 mole percent CO and 1–5 mole percent promoter and is flowed over the catalyst for up to 5 or more hours at a pressure which can range up to about 1000 or 5000 p.s.i.g. A pressure of about atmospheric up to about 350 p.s.i.g. and a contact time of about 1–3 hours are preferred.

The carbonylation gas converts the contaminant metals, especially nickel and iron, to carbonyls and usually removes the volatile carbonyls. Where nickel is the predominant poisoning metal, the process serves for rather complete removal of this metal from the surface of the catalyst and gives a product of greatly increased favorable activity in a subsequent hydrocarbon conversion.

The process of this invention may be supplemented by procedures designed primarily for vanadium removal as mentioned above. Such a removal procedure may include chlorination, or, in the case of a silica-magnesia catalyst, a wash with a basic aqueous medium. In either alternative, treatment of the regenerated catalyst with molecular oxygen-containing gas is frequently desirable. Such treatment is described in copending applications Serial No. 19,313, filed April 1, 1960, and Serial No. 55,160, filed September 12, 1960, hereby incorporated by reference. The temperature of this treatment is generally in the range of about 1000° F. to 1600° F. or more. Little or no effect on metals removal is accomplished by treatment below about 1000° F., even for an extended time. The upper limit, to avoid catalyst damage, will usually be below about 1800° F. Preferably a temperature of about 1200–1400° F. is used and a pressure from atmospheric to about 1000 p.s.i.g., preferably up to about 15 p.s.i.g. is imposed. In general, the oxygen treatment may last for about 24 or more hours, preferably for about 1–6 hours. If any significant amount of carbon is present at the start of this high-temperature treatment, the essential oxygen contact is that continued after carbon removal. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. The duration of the treatment and the amount of vanadium prepared by the treatment for later removal is dependent on the temperature and characteristics of the equipment used. The length of the treatment may vary from the short time necessary to produce an observable effect to a time just long enough not to damage the catalyst. In general, the time is inversely variable with the temperature employed. The oxygen-containing gas used in the treatment contains molecular oxygen as the essential active ingredient. The gas may be oxygen, or a mixture of oxygen with inert gas, such as air or oxygen-enriched air. The proportion of oxygen in the treating gas may range widely, e.g. from about 2 to 100 mole percent, but generally will be at least about 15%.

The removal of vanadium contaminant in the form of the volatile chlorides may be accomplished by chlorinating the catalyst after carbonylation. This conversion to chloride, as described in copending application Serial No. 849,199, filed October 28, 1959; Serial No. 54,532, filed September 7, 1960, now abandoned; Serial No. 54,405, filed September 7, 1960, and Serial No. 55,703, filed September 13, 1960, preferably makes use of chlorination at an elevated temperature wherein the catalyst composition and structure is not materially harmed by the treatment and a substantial amount of the poisoning metal content is converted to chloride. This vapor phase chlorination is conducted at a moderately elevated temperature up to about 700° F. or even up to about 900 or 1000° F., wherein the catalyst composition and structure is not materially harmed by the treatment and a substantial amount of the poisoning metals content is converted to chlorides. The chlorination takes place at a temperature of at least about 300° F., preferably about 550 to 650° F., with optimum results being obtained close to about 600° F. The chlorination, even when conducted in the lower temperature ranges, e.g. below about 550° F., is effective for conversion to chlorides of the metal poisons. In the higher temperature ranges, above about 550° F., the treatment with the vaporous chlorinating mixture serves simultaneously also to remove, by volatilization, iron and vanadium chlorides such as ferric chloride, vanadium oxychloride and/or vanadium tetrachloride formed by chlorination. When volatilization of these compounds is not performed or not completed during chlorination, the chlorination may be followed by a purge with an inert gas such as nitrogen or flue gas in these higher temperature ranges, that is, about 550° F. to 700° F. or 1000° F., for volatilization of these compounds.

The chlorinating reagent is a vapor which contains chlorine, preferably in combination with carbon or sulfur. Such reagents include molecular chlorine as well as the chlorine substituted light hydrocarbons, such as carbon tetrachloride, which may be used as such or formed in situ by the use of, for example, a vaporous mixture of chlorine gas with low molecular weight hydrocarbons such as methane, n-pentane, etc. Also, it has been found that a mixture of the carbon or sulfur chlorinating reagent with a gas, such as molecular chlorine or HCl which can supply additional chlorine, is effective in reducing the amount of chlorinating reagent required for effective conversion of vanadium to its volatile chlorides. Molecular chlorine is considerably less expensive than carbon tetrachloride so that a gaseous mixture of the two is a preferred chlorinating reagent. The presence of molecular chlorine also seems to have the advantageous effect of keeping the vanadium in its higher, more volatile valence state; that is, as vanadium oxytrichloride or vanadium tetrachloride; vanadium trichloride is relatively nonvolatile. Since either molecular chlorine or HCl alone has a relatively less effect in chlorinating the catalysts, it is theorized that the presence of these auxiliary gases serves mainly to regenerate the carbon or sulfur chlorinating reagent in situ. Useful inorganic sulfur-containing compounds include the volatilizable sulfur chlorides; viz, sulfur monochloride, $S_2Cl_2$, sulfur dichloride, $SCl_2$, thionyl chloride, $SOCl_2$, and sulfuryl chloride, $SO_2Cl_2$. Hydrogen sulfide or other suitably reactive sulfur-containing material may be used with chlorine for in situ generation of the covalent sulfur compound, but the reaction by-products, such as additional HCl formed, may present a waste disposal problem. Sulfur dichloride may be supplied to the chlorination procedure as a liquid and upon vaporization will give a mixture of sulfur monochloride and chlorine. Also, the chlorinating agents may be mixed with another gas such as nitrogen that is inert in this system.

The stoichiometric amount of chlorine required to convert iron, nickel and vanadium to their most highly chlorinated compounds is the minimum amount of total chlorine ordinarily used. However, since the stoichiometric amount of chlorine frequently is in a neighborhood of only 0.001 g./g. of catalyst, a much larger amount of chlorine, say about 1–40 percent active chlorinating agent based on the weight of the catalyst is used. The promoter, that is, the chlorine compound of carbon or sulfur, is generally used in the amount of about 1–5 or 10 percent or more, preferably about 2–3 percent, based on the weight of the catalyst for good metals removal; however, even if less than this amount is used, a considerable improvement in metals conversion is obtained over that which is possible at the same temperature using chlorine alone. The amount of promoter may vary depending upon the manipulative aspects of the chlorination step, for example, a batch treatment may sometimes require more promoter than a continuous treatment for the same degree of effectiveness and results. The chlorine and promoter may be supplied individually or as a mixture to a poisoned catalyst or, as pointed out above, as a material suitable for generation of such a mixture in situ. Such a mixture may contain about 0.1 to 50 parts chlorine or HCl per part of promoter, preferably about 1–10 parts per part of promoter. A chlorinating gas comprising about 1–30 weight percent chlorine, based on the catalyst, together with one percent or more $S_2Cl_2$ gives good results. Preferably, such a gas provides 1–10 percent $Cl_2$ and about 1.5 percent $S_2Cl_2$, based on the catalyst. A "saturated" mixture of $CCl_4$ and $Cl_2$ or HCl can be made by bubbling chlorine or hydrogen chloride gas at room temperature through a vessel containing $CCl_4$; such a mixture generally contains about 1 part $CCl_4$; 5–10 parts $Cl_2$ or HCl.

The chlorinating mixture is essentially anhydrous, that is, if changed to the liquid state no separate aqueous phase would be observed. As the amount of water in the chlorinating agent increases, additional time and/or chlorinating agent may be required to obtain a given amount of metal removal. This inhibiting effect is also evident when water is present in the catalyst so that it is preferred that the catalyst contain less than about 1 or 2% volatile matter, that is, matter which is removable by heating to 1000° C. A pressure of about 0–100 or more p.s.i.g., preferably 0–15 p.s.i.g. may be maintained in chlorination, the contacting usually lasting for at least about five minutes, preferably about 15 minutes to an hour, but shorter or longer reaction periods may be possible or needed, for instance, depending on the linear velocity of the chlorinating vapors. In some cases, particularly when the chlorination is performed at a temperature too low to volatilize sufficient of the chlorides, the chlorination treatment may be followed, or interrupted, by a purge of the catalyst with an inert gas, as described above.

Rather than subject a magnesium-containing catalyst to the acid environment of chlorination, such a catalyst is subjected to a basic aqueous wash at a controlled pH to effect the removal of vanadium. The pH of the aqueous wash slurry should be so maintained that the result will be a maximum metals contaminant removal and a minimum magnesia loss. This is effected in the practice of this invention by maintaining the pH of the aqueous wash slurry at about 7.0 to 12.0 by the addition of a basic reagent. The reagent may be a water-soluble organic or inorganic ammonium compound such as ammonium carbonate; methylamine. An aqueous solution of ammonium hydroxide is highly preferred. The selected solute will be one which dissociates or ionizes in the aqueous solution and which can be washed away or which vaporizes or decomposes to vaporizable materials under catalyst regeneration or similar high temperature treatment. Acidic solutions, e.g. those of the ammonium salts of acids such as nitric and acetic are to be avoided. Even ammonium or amine compounds of limited water solubility are usable in this invention due to the small concentration of ammonium ion needed. The preferred solutions have a pH of about 8 to 11.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about a minute, are satisfactory, while the time of washing may last 2 to 5 hours or longer.

After the ammonium wash the catalyst slurry can be filtered to give a cake which may be reslurried with water or rinsed in other ways, such as, for example, by a water wash on the filter, and the rinsing may be repeated, if desired, several times. A repetition of the ammonium wash without other treatments seems to have little effect on vanadium removal if the first washing has been properly conducted. However, repetition of the basic aqueous ammonium wash after, for example, the high temperature oxygen treatment described above, does serve to further diminish the vanadium content of the catalyst.

After metal removal, the catalyst is conducted to a hydrocarbon conversion system. Prior to reusing the catalyst in the conversion operation it can be calcined, say at temperatures usually in the range of about 700 to 1300° F. conveniently by addition to the cracking unit catalyst regenerator. A fluidized solids technique is recommended for these vapor contact processes as a way to shorten the time requirements. After the available catalytically active poisoning metal has been removed in any removal procedure, further reaction time has relatively little effect on the catalytic activity of the depoisoned catalyst, although further metals content may be removed by repeated or other treatments.

The catalyst to be treated may be removed from a hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. of poisoning metal will be accumulated on the catalyst before demetallization is warranted. A small portion of the catalyst is preferably removed from the hydrocarbon conversion system and given the conventional oxidation regeneration which serves to remove carbonaceous deposits. The treatment of this invention is effective despite the presence of a small amount of carbon on the treated catalyst, but preferably the regeneration is continued until the catalyst contains not more than about 0.5% carbon before a subsequent oxygen treatment. Where the catalyst is subjected to the oxygen treatment before it is substantially carbon free, the length of oxygen treatment, is reckoned from the time that the catalyst reaches the substantially carbon-free state, that is, the state where little, if any, carbon is burned even when the catalyst is contacted with oxygen at temperatures conductive to combustion.

In practicing one embodiment of this invention at the refinery, a portion of the poisoned catalyst is removed from the hydrocarbon conversion system after being regenerated, is given a high temperature treatment with an oxygen-containing gas at a temperature and for the length of time found to be sufficient to increase subsequent vanadium removal without damaging the catalyst, then the catalyst is maintained in a hydrogen sulfide or a hydrogen sulfide-inert gas mixture for 1 to 2 hours at temperatures approximating 1200° F. The sulfiding gas is purged from the catalyst by an inert gas, then carbonylation is performed at a cooler temperature in the range outlined. The catalyst is then chlorinated and subjected to a purge with inert gas to remove the volatile chlorinated metal contaminant. The treated catalyst can be returned to the unit, for example, to the regenerator, as make-up catalyst, reducing greatly the new catalyst requirement. The amount of Ni or V removed in practicing the procedures outlined or the proportions of each which are removed may be varied by proper choice of treating conditions. It may prove necessary, in the case of very severely poisoned catalysts, to repeat the treatment to reduce the metals to an acceptable level, perhaps with variations where one metal is greatly in excess. For example, when nickel and/or iron are the principal metals to be removed, the sulfiding and carbonylation, will serve to give an improved activity pattern to the catalyst. Where the removal of vanadium as well as iron and nickel is required, chlorination or a basic aqueous wash is employed after carbonylation. The preliminary oxygen treatment improves the vanadium removal effect of chlorination or washing.

The frequency of treatment and the fraction of catalyst inventory treated will be dependent on the severity of the metal problem at the unit in question. The apparatus used to perform the process of the invention may be suitable for conducting part or all of the procedures with fluidized beds of finely divided catalyst in the various operations. When fluidized manipulations are to be used, the various gas or vapor treating agents described may be supplemented with inert fluidizing gases, such as nitrogen, where the flow of active gas is not sufficient for fluidization.

EXAMPLES

The following examples are illustrative of the invention but should not be considered limiting.

*Example I*

A "Nalcat" synthetic gel silica-alumina fluid-type cracking catalyst composed of about 25% $Al_2O_3$, substantially the rest $SiO_2$, was used in a commercial catalytic cracking conversion unit, using conventional fluidized catalyst techniques, including cracking and air regeneration to convert a feedstock (A) comprising a blend of Wyoming and Mid-Continent gas oils containing about 1.2 p.p.m. $V_2O_5$, 1.0 p.p.m. Fe, 0.3 p.p.m. NiO and about 2 weight percent S. This gas oil blend had a gravity (API) of 24°, a carbon residue of about 0.3 weight percent and a boiling range of about 500 to 1000° F. When this catalyst had a vanadium content of 4320 p.p.m., measured as $V_2O_5$, 327 p.p.m. NiO and 0.320% Fe, a sample was removed from the cracking system after regeneration. A batch of this base catalyst No. 1 sample, subjected to magnetic flux for iron removal, was used to test-crack a petroleum hydrocarbon East Texas gas oil fraction (feedstock B) having the following approximate characteristics:

| | | |
|---|---|---|
| IBP | ° F | 490–510 |
| 10% | ° F | 530–550 |
| 50% | ° F | 580–600 |
| 90% | ° F | 650–670 |
| EP | ° F | 690–710 |
| Grav. (API) | degrees | 33–35 |
| Visc. (SUS) at 100° F. | | 40–45 |
| Aniline point | ° F | 170–175 |
| Pour point | ° F | 35–40 |
| Sulfur | percent | 0.3 |

A sample of this base catalyst No. 1 is contacted for 1½ hours at 1150° F. with $H_2S$ at atmospheric pressure. The catalyst is then cooled to 120° F. under a nitrogen purge and then is treated for two hours with CO at about 200° L. and 400 p.s.i.g. Analysis of the treated catalyst shows about 50% removal of nickel and about 25% removal of iron. Use of this sample in test cracking of feedstock B gives significantly improved results.

*Example II*

A 3000 g. sample of poisoned catalyst No. 1 is subjected to air at 1300° F. for four hours. This catalyst sample is then cooled to 1150° F. where it is sulfided with $H_2S$ for 1½ hours. The catalyst is purged for ten minutes with dry nitrogen at 900° F. to remove excess $H_2S$ vapors. It is then subjected to a carbon monoxide treat at 180° F. and 800 p.s.i.g. for 6 hours to convert and remove nickel and iron from the catalyst surface as carbonyls. The removal of vanadia and residual iron is next accomplished by treating this catalyst at about 600° F. with a vaporous mixture which provides 5% $CCl_4$ and 2% $Cl_2$, based on the weight of the catalyst, for 1 hour. Use of this demetallized catalyst in test cracking feedstock B gives greatly improved results.

*Example III*

A synthetic-gel silica-magnesia fluid-type cracking catalyst composed of about 28% MgO, substantially the rest $SiO_2$ is used in a commercial catalytic cracking conversion unit, using conventional fluidized catalyst techniques, including cracking of feedstock A described above and air regeneration. When this catalyst has a vanadium content of 4280 p.p.m., measured as $V_2O_5$, 315 p.p.m. NiO and 0.330% Fe, a sample is removed from the cracking system after regeneration. A batch of this base catalyst No. 2 sample, subjected to magnetic flux for iron removal, is used to test-crack feedstock B.

A 3000 g. sample of this poisoned catalyst is subjected to air at 1300° F. for four hours. The catalyst is then sulfided with $H_2S$ for 1½ hours at 1175° F. and purged with $N_2$ for 10 minutes at 900° F. It is then subjected to a carbon monoxide treatment at 180° F. and 800 p.s.i.g. for 6 hours to remove nickel from the catalyst surface as a carbonyl. The catalyst is then slurried in 10 l. of a dilute ammonium hydroxide solution containing 6 g. of $NH_4OH$ and held at 212° F. for one hour. The catalyst is filtered, dried, and returned to the hydrocarbon conversion system having a poisoning metals content of about 81 p.p.m. NiO, 3202 p.p.m. $V_2O_5$ and 0.218% Fe. A sample of the demetallized catalyst gives results in test-cracking feedstock B superior to those obtained with the catalyst before demetallization.

As pointed out, a major advantage of the process of the invention is that the need for contact of the catalyst with aqueous and/or acid media heretofore proposed for demetallization can be eliminated. Thus alumina or magnesia losses which may stem from such contacting are prevented, as well as great heat losses due to the use of large quantities of water.

We claim:

1. A method for removing nickel from a synthetic gel, silica-based hydrocarbon cracking catalyst which has been contaminated with nickel by use in a cracking system wherein catalyst is cycled between a cracking zone and a regeneration zone in which cracking zone a higher-boiling, hydrocarbon feedstock containing nickel contaminant is catalytically cracked to gasoline and in which regeneration zone the catalyst is regenerated by oxidizing and thereby removing carbon therefrom, which comprises bleeding a portion of the nickel-contaminated catalyst from the cracking system, sulfiding said nickel-contaminated catalyst by contacting bled catalyst with a vaporous sulfiding agent at an elevated temperature to enhance subsequent nickel removal from the catalyst, contacting sulfided catalyst with carbon monoxide at a lower temperature to form and flush off nickel carbonyl and returning to a cracking system catalyst reduced in nickel contaminant.

2. The method of claim 1 in which the sulfiding treatment is at a temperature of about 800 to 1500° F. and carbon monoxide treatment takes place at a temperature of about ambient temperature to 300° F.

3. The method of claim 1 in which sulfiding is preformed by contact of the catalyst with $H_2S$ at about 1100 to 1300° F.

4. The method of claim 1 which includes treating a catalyst containing nickel and vanadium contaminant, before sulfiding, with a molecular oxygen containing gas at an elevated temperature for a time sufficient to convert a significant amount of the vanadium to a higher valence state.

5. The method of claim 4 which includes the step of chlorinating the catalyst with a chlorinating vapor after the carbonylation treatment.

6. The method of claim 5 in which the chlorination is performed at a temperature up to about 1000° F.

7. The method of claim 4 wherein the catalyst is silica-alumina.

8. The method of claim 1 wherein the catalyst is silica-alumina.

9. The method of claim 1 wherein the amount of nickel contaminant on the catalyst is about 250 to 5000 parts per million calculated as the metal oxide.

10. A method for removing nickel and vanadium from a synthetic gel, silica-based hydrocarbon cracking catalyst which has been contaminated with nickel and vanadium by use in a cracking system wherein catalyst is cycled between a cracking zone and a regeneration zone in which cracking zone a higher-boiling hydrocarbon feedstock containing nickel and vanadium contaminants is catalytically cracked to gasoline and in which regeneration zone the catalyst is regenerated by oxidizing and thereby removing carbon therefrom, which comprises bleeding a portion of the nickel- and vanadium-contaminated catalyst from the cracking system, treating bled, substantially carbon-free catalyst with a molecular oxygen-containing gas at a temperature of about 1000 to 1600° F. to enhance vanadium removal from the catalyst, sulfiding said nickel-contaminated catalyst by contacting the oxygen-treated catalyst at a temperature of about 500 to 1500° F. with a vaporous, sulfiding agent to enhance nickel removal therefrom, contacting the sulfided catalyst with carbon monoxide at a temperature substantially lower than the sulfidation temperature to form and flush off nickel carbonyl, chlorinating metal contaminant remaining on the catalyst by contacting said catalyst with a chlorinating vapor to remove metal contaminants including vanadium, and returning to a cracking system catalyst reduced in nickel and vanadium contaminants.

11. The method of claim 10 wherein the catalyst is silica-alumina.

12. The method of claim 10 wherein the amount of metal contaminants on the catalyst is about 250 to 5000 parts per million calculated as the metal oxides.

13. A method for removing nickel and vanadium from a synthetic gel, silica-based hydrocarbon cracking catalyst which has been contaminated with nickel and vanadium by use in a cracking system wherein catalyst is cycled between a cracking zone and a regeneration zone in which cracking zone a higher-boiling hydrocarbon feedstock containing nickel and vanadium contaminants is catalytically cracked to gasoline and in which regeneration zone the catalyst is regenerated by oxidizing and thereby removing carbon therefrom, which comprises bleeding a portion of the nickel- and vanadium-contaminated catalyst from the cracking system, said portion containing about 250 to 5000 parts per million nickel and vanadium calculated as the metal oxides, treating bled, substantially carbon-free catalyst with air at a temperature of about 1200 to 1600° F., to enhance vanadium removal from the catalyst, sulfiding the oxygen-treated catalyst with $H_2S$ at a temperature of about 800 to 1600° F. to enhance nickel removal therefrom, treating the sulfided catalyst with carbon monoxide at a temperature of from about ambient to 300° F. to form and flush off nickel carbonyl, chlorinating the metal contaminant remaining on the catalyst by contacting said catalyst with an agent comprising essentially $Cl_2$ and $CCl_4$ at a temperature of up to about 1000° F. to remove metal contaminants including vanadium and returning to a cracking system catalyst reduced in nickel and vanadium contaminants.

14. A method for removing nickel and vanadium from a synthetic gel, silica-based hydrocarbon cracking catalyst which has been contaminated with nickel and vanadium by use in a cracking system wherein catalyst is cycled between a cracking zone and a regeneration zone in which cracking zone a higher-boiling hydrocarbon feedstock containing nickel and vanadium contaminants is catalytically cracked to gasoline and in which regeneration zone the catalyst is regenerated by oxidizing and thereby removing carbon therefrom, which comprises bleeding a portion of the nickel- and vanadium-contaminated catalyst from the cracking system, said portion containing about 250 to 5000 parts per million nickel and vanadium calculated as the metal oxides, treating bled, substantially carbon-free catalyst with air at a temperature of about 1200 to 1600° F. for about 1 to 24 hours to enhance vanadium removal from the catalyst, sulfiding the oxygen-treated catalyst with $H_2S$ at a temperature of about 1100 to 1300° F. for about 1 to 20 hours to enhance nickel removal therefrom, treating the sulfided catalyst with carbon monoxide at a temperature of from about ambient to 300° F. for about 1 to 5 hours to form and flush off nickel carbonyl, chlorinating the metal contaminant remaining on the catalyst by contacting said catalyst with an agent comprising essentially $Cl_2$ and $CCl_4$ at a temperature of about 300 to 700° F. for about 5 to 60 minutes to remove metal contaminants including vanadium and returning to a cracking system catalyst reduced in nickel and vanadium contaminants.

References Cited in the file of this patent

UNITED STATES PATENTS

| | | |
|---|---|---|
| 2,575,258 | Corneil et al. | Nov. 31, 1951 |
| 2,615,831 | Bishop et al. | Oct. 28, 1952 |
| 2,668,798 | Plank | Feb. 9, 1954 |
| 2,835,557 | West et al. | May 20, 1958 |